United States Patent [19]

Newell

[11] 4,097,178
[45] Jun. 27, 1978

[54] DIEHEAD CHASER CARRIER

[75] Inventor: Denis Alfred Newell, Coventry, England

[73] Assignee: Alfred Herbert Limited, Coventry, England

[21] Appl. No.: 690,837

[22] Filed: May 28, 1976

[30] Foreign Application Priority Data

Jun. 11, 1975 United Kingdom ............... 24931/75

[51] Int. Cl.² .................. B23B 51/00; B23B 51/14; B26D 1/12

[52] U.S. Cl. ................... 408/151; 408/153; 408/158; 408/186; 408/238; 407/79; 407/88; 407/91

[58] Field of Search ............... 408/146, 147, 150, 151, 408/153, 158, 161, 162, 163, 181, 184, 185, 186, 190, 231, 238, 239, 240, 241; 82/36; 29/95 R, 96

[56] References Cited

U.S. PATENT DOCUMENTS

| 409,208 | 8/1889 | Landis | 408/151 |
|---|---|---|---|
| 637,772 | 11/1899 | Eilers | 408/163 |
| 1,354,305 | 9/1920 | Johnson | 408/151 |
| 1,397,238 | 11/1921 | Shearer | 408/151 |
| 1,497,409 | 6/1924 | Shaw | 408/231 X |
| 1,510,962 | 10/1924 | Russell | 408/158 |
| 2,239,736 | 4/1941 | Reimschissel et al. | 408/153 |
| 3,477,076 | 11/1969 | Strickland | 408/153 |
| 3,844,008 | 10/1974 | Sletten | 29/96 |

FOREIGN PATENT DOCUMENTS

| 1,094,945 | 12/1954 | France | 29/96 |
|---|---|---|---|
| 65,953 | 12/1912 | Switzerland | 408/186 |
| 1,252,888 | 11/1971 | United Kingdom | 29/95 R |

Primary Examiner—Harrison L. Hinson

[57] ABSTRACT

A holder for use with a screw cutting diehead of a machine tool, the holder having a recess for the reception of a thread chaser element, which recess has a surface arranged to locate the chaser element therein at a predetermined helix angle, and the holder being adapted to permit the element to be gripped in position therein. The invention also includes the combination of a chaser carrier and separate chaser holder mounted therein.

16 Claims, 14 Drawing Figures

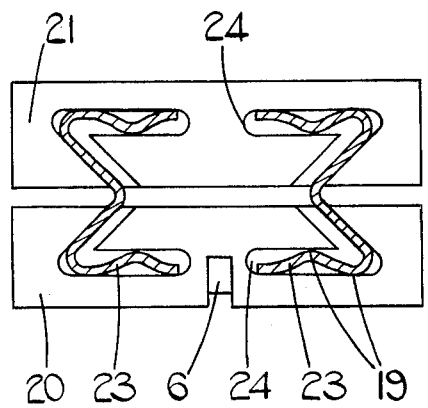
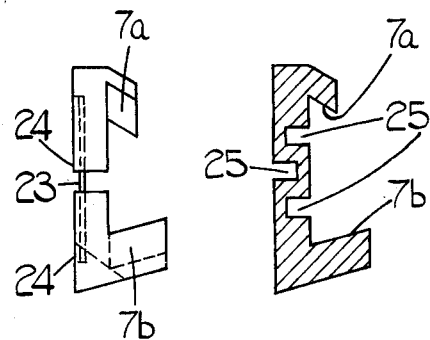
FIG.8.    FIG.9.    FIG.10.
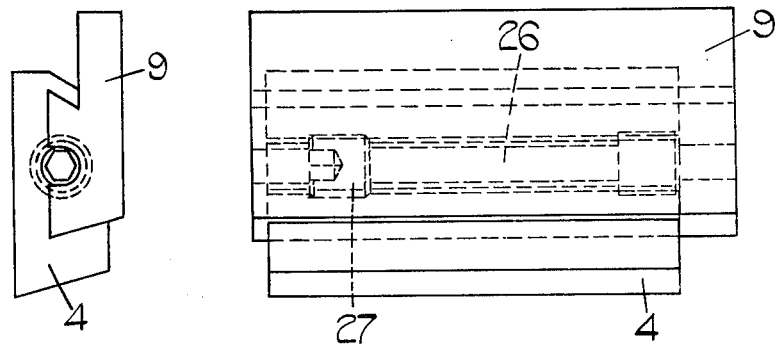
FIG.11.    FIG.12.
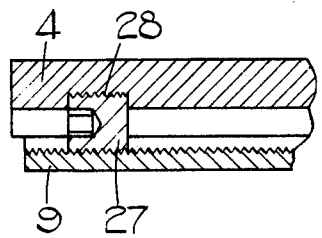
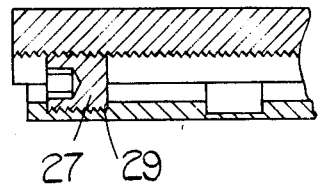
FIG.13.    FIG.14.

DIEHEAD CHASER CARRIER

This invention relates to a holder for a thread chaser element and to a chaser carrier for the reception of such a holder, the carrier serving to mount the chaser element on a die head of a machine tool.

In conventional chaser carriers, for accurate location of the chaser element in the carrier at the required helix angle corresponding to the thread form on the chaser element, it is necessary to provide a location surface on the carrier, accurately machined to the required angle relative to the die head axis. With such a carrier, the range of variation of the helix angle obtainable is approximately plus or minus 15% and it is often necessary to provide, for a given die head, as many as four or five sets of chaser carriers of differing helix angles in order to provide the requisite flexibility of operation of the die head. The carriers are of complex form and the necessity to provide several alternative carriers involves considerable expense.

An object of the invention is to provide an improved holder for a chaser carrier element and a chaser carrier for reception of the holder, by which arrangement a range of chasers can be inclined at differing helix angles without substitution of the entire chaser carrier.

According to the invention, a chaser holder for use with a chaser carrier has a recess for reception of a thread chaser element, the recess having a surface arranged to locate the chaser element therein at the required helix angle, and the holder being adapted to permit the chaser element to be gripped in position therein.

Preferably, the holder is deformable, conveniently in a direction generally transversely of the recess to permit gripping of the chaser element therein.

The holder may conveniently have at least one slot extending generally in the direction of the recess to facilitate said deformation of the holder.

In an alternative arrangement the holder is in a plurality of parts, preferably but not necessarily interconnected by resilient elements, and said deformation of the holder is permitted by resilient flexing of the elements.

From another aspect of the invention, a chaser carrier comprises a body adapted to be mounted on a die head, a separate chaser holder mounted on the body and adapted to receive and grip a thread chaser element therein, and a clamp adapted to engage the holder and retain it in position in the carrier, the arrangement being such that a surface of the holder locates the chaser in the carrier at the required helix angle.

Preferably, the holder is deformable and the clamp engages the holder in such a manner as to deform it and thereby grip the chaser element therein.

Conveniently, the holder is adapted to receive the chaser in sliding engagement in said recess and means are provided permitting relative sliding adjustment of the chaser in the holder in a direction generally tangentially of a die head when the carrier is mounted therein.

The invention will now be described, by way of example, with reference to the accompanying drawings in which:

FIGS. 8 and 9 show an alternative embodiment of the holder;

FIG. 10 shows a cross-sectional view of a still further embodiment of the holder;

FIGS. 11 to 13 illustrate part of a carrier of the invention incorporating means for adjusting the position of a holder therein, and FIG. 14 shows an alternative manner of obtaining adjustment between a holder and its carrier.

Figure 1:
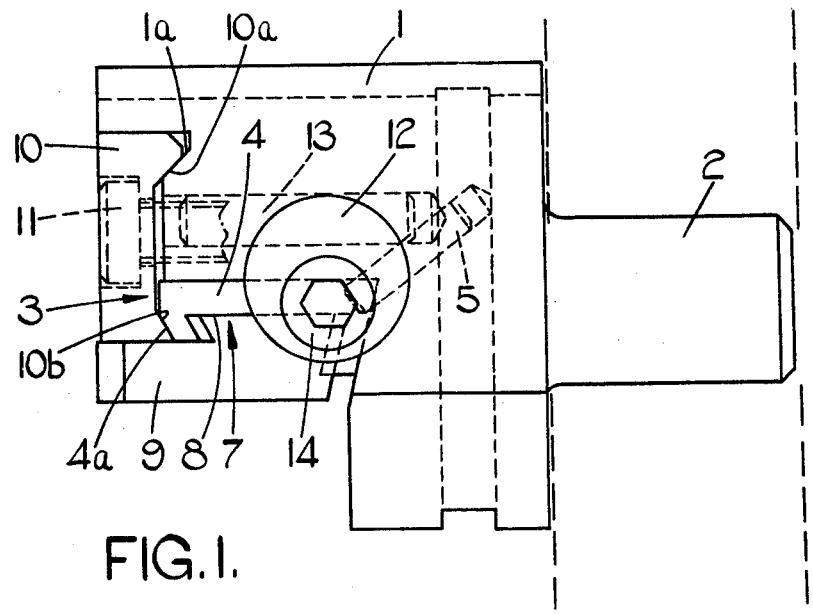
FIGS. 1 and 2 are respective side elevations of a chaser carrier of the invention.
Figure 2:
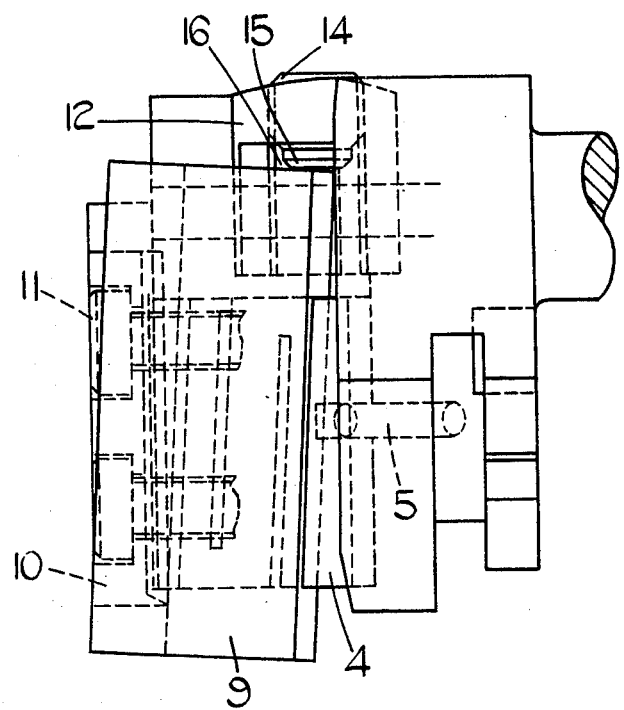
Figure 3:
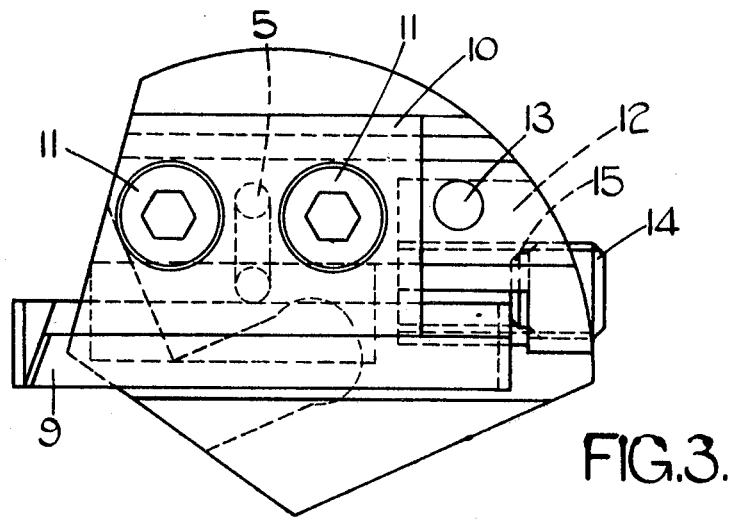
FIG. 3 is an end elevation of the carrier of FIGS. 1 and 2.
Figure 4:
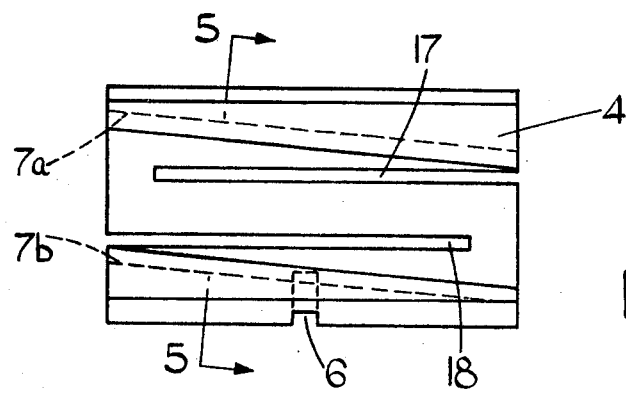
FIG. 4 is an elevation of one form of holder for use with the chaser carrier of FIGS. 1 to 3.
Figures 5, 6, 7:
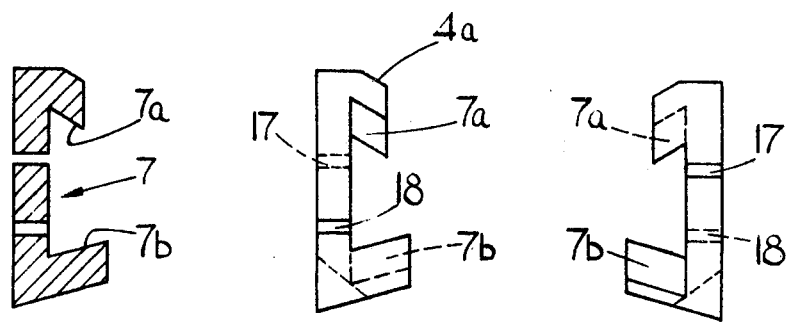
FIG. 5 is a cross-section along the line 5—5 of FIG. 4.
FIGS. 6 and 7 are views from opposite ends of the holder of FIGS. 4 and 5.

Referring to FIGS. 1 to 3 of the drawings, these show a chaser carrier having a body 1 and a shank 2 for rotatably mounting the carrier on a die head (indicated in dotted lines in FIG. 1) in known manner. The carrier has a recess 3 extending perpendicularly to the rotary axis of the shank 2 and mounted within this recess is a chaser holder 4 which is located longitudinally of the slot in a tangential plane by a peg 5 extending from the body to engage in a notch 6 in the holder (FIG. 4). The holder 4 has a longitudinal recess 7 of generally dove tail formation which receives a complementary portion 8 of a chaser element 9. A clamp 10 engages one side of the holder 4 and has clamping screws 11 engaged in a threaded hole of the body 1 to provide a clamping force on the holder in the manner to be described. An inclined surface 10a of the clamp engages a correspondingly inclined surface 1a of the body and a further inclined surface 10b of the clamp engages a correspondingly inclined surface 4a of the holder.

When a chaser element 9 is initially inserted into the holder 4, it is necessary to adjust its position accurately in relation to the centre of rotation of the diehead. For this purpose, there is provided an adjusting device which includes a support member in the form of a plug 12, press-fitted into the body 1 and retained by an axially extending dowel or spring pin 13. An externally threaded adjusting screw 14 is mounted in a threaded bore of the body 12 and has a nose 15 which engages an adjacent end surface 16 of the chaser element so that, by rotating the screw 14 in one direction, the chaser element can be slidably adjusted to the left, as viewed in FIG. 2.

FIGS. 4 to 7 show, in more detail, one form of chaser holder for use with the carrier of FIGS. 1 to 3, FIG. 5 being a cross-section along the line 5—5 of FIG. 4. It will be seen that the parallel side surfaces 7a, 7b of the recess 7 are inclined to the longitudinal axis of the holder, the angle of inclination being chosen so that a chaser element 9 supported in the recess on these surfaces will be disposed at the required helix angle, as seen in FIG. 2. The holder 4 has a pair of spaced parallel slots 17, 18, each of which extends from a respective end of the holder over a major portion of the length thereof. The slots may alternatively be disposed at an angle to the longitudinal axis of the holder, preferably parallel respectively with the sides 7a, 7b of the recess. By virtue of the slots 17, 18 the holder is capable of a certain resilient deformation in a direction transverse to the slots and this permits the holder to grip the chaser element tightly therein when the clamp 10 is tightened against the face 4a of the holder.

FIGS. 8 and 9 illustrate an alternative embodiment of holder which is formed in two parts 20, 21, the parts being interconnected by a pair of generally U-shaped spring elements 23 housed in pairs of angled grooves 24 in the respective parts of the holder and retained in these grooves by peening of the grooves at spaced locations as indicated at 19. In this embodiment, it is the spring elements 23 which deform, under the action of the clamp 10 to permit the holder to grip a chaser 9 therein.

A further embodiment of holder is shown in FIG. 10, the resilience of the holder in this case being provided by grooves 25 formed in opposed surfaces of a wall thereof. These grooves preferably, but not necessarily, extend over the whole length of the holder and can either be parallel to the longitudinal axis of the holder or inclined thereto, preferably at the angle of the faces 7a and 7b, as in previous embodiments.

FIGS. 11 to 13 show one manner of providing relative sliding adjustment between the holder 4 and chaser element 9 to enable the latter to be adjusted correctly in relation to the diehead rotational axis. The chaser has a row of teeth formed therein to constitute a longitudinally extending rack 26 and the holder is provided with a rotatable threaded element 27 of the same pitch as the teeth of the rack 26, held captive in a groove 28 of the holder. Rotation of the element 27 in one direction or the other will produce corresponding sliding adjustment of the chaser element in the holder, enabling the position of the element with respect to the diehead rotational axis to be accurately set.

FIG. 14 shows the converse arrangement to FIGS. 11 and 12 in which the rotatable element 27 is captively mounted in a groove 29 of the chaser element and rack teeth are formed on an adjacent surface of the holder. Rotation of the element 27 produces an effect similar to that achieved in the construction of FIGS. 11 and 12.

Various modifications can be made to the adjustment arrangements of FIGS. 11 to 13 and 14. Thus, for example, the grooves 28 and 29 of these embodiments could be dispensed with and the elements 27 held in place by a resilient retainer such as that known in the trade as a "Truarc" retainer. A further alternative is to provide the rack on a surface of the chaser element adjacent to one of the gripped surfaces thereof, in which arrangement the element 27 would be retained captively in the holder.

The invention thus provides a carrier chaser arrangement which is simple to use and, because it avoids duplication of the entire chaser carrier for the accommodation of a range of helix angles, is relatively inexpensive to manufacture.

I claim:

1. A holder for use with a carrier, mountable on a die head for securing a chaser at a required helix angle to a workpiece, said holder comprising an elongated body having a longitudinal recess for reception of a thread chaser element, said recess being generally channel shaped in cross-section and being defined by a base and a pair of opposed sides, at least one of said sides having a surface inclined to the longitudinal axis of said body to align the chaser element therein at the required helix angle, a pair of slots extending completely through said base and inwardly respectively from opposite ends of the body into overlapping relationship, whereby said sides are relatively movable generally parallel to each other and in a direction generally transverse to the recess to grip the chaser element within said recess.

2. The holder according to claim 1, wherein said slots are parallel to each other.

3. The holder according to claim 1, wherein said slots are parallel to the surface locating said chaser element.

4. The holder according to claim 1, wherein the recess is of generally dovetail transverse cross-section.

5. A holder for use with a carrier mountable on a die head for securing a chaser at a required helix angle to a workpiece comprising an elongated body formed of two parts and resilient means for interconnecting said parts, said parts being shaped to cooperatively provide a longitudinal recess for the reception of a thread chaser element, said recess being generally channel shaped in cross-section and being defined by a base and a pair of opposed sides, one of said sides having a surface inclined with respect to the axis of said body arranged to align the chaser element there at the required helix angle, said parts being arranged so that the parts are relatively movable with respect to each other to permit gripping of the chaser element between said sides, each of the parts of said body having a base and a side wall and lie in opposition to each other whereby said sides and bases define said recess, said bases having grooves therein, and said resilient interconnecting means comprise springs lodged in said grooves to enable generally parallel movement of said parts transverse to the recess.

6. The holder according to claim 5, wherein said body is formed of only two parts, each part having a base and a side wall and lie in opposition to each other whereby said sides and bases define said recess, said bases having grooves therein, and said resilient interconnecting means comprise springs lodged in said grooves to enable movement of said parts transverse to the recess.

7. The holder according to claim 6, wherein said springs are bent leaf springs.

8. The holder according to claim 5, wherein the opposing surfaces of said side walls are inclined with respect to each other to form a dovetail recess and the exterior surfaces of said holder body are cooperatively formed.

9. The combination of a carrier and a holder for a chaser element maintainable on a die head for securing the chaser element at a required helix angle to a workpiece, said holder comprising an elongated body having a longitudinal recess for receiving and aligning the chaser element with respect to the workpiece, said body being deformable at least in part transversely to said recess, and clamp means for securing said holder to said carrier and simultaneously deforming said body to secure said chaser element in said recess.

10. The combination according to claim 9, wherein said carrier includes an axial shaft for attachment to the die head, and a slot formed perpendicularly to the axis of said shaft for reception of said holder body, said slot being defined on one side by a fixed wall of said carrier and on the other side by said clamping means whereby said holder body may be deformed.

11. The combination of claim 10, wherein said clamp means comprise adjustable screw fasteners securable to the body.

12. The combination according to claim 9, including adjustment means mounted on said carrier for engaging the end of said chaser element opposite the working end for adjusting the position of said chaser element within the recess of said holder body relative to said carrier and workpiece.

13. The combination according to claim 12, wherein said adjustment means comprises screw means mounted within said carrier, the end of which engages said chaser element.

14. The combination according to claim 9, wherein said adjustment means comprises teeth on one of the carrier and element forming a rack and a threaded rotatable element captive on the other of the carrier and element and in mesh with the rack.

15. The combination according to claim 9, wherein said holder comprises a body, and said recess is defined by a base and a pair of opposed side walls formed in said body, said base having a pair of slots extending therethrough inwardly respectively from opposite ends of said body into overlapping relationship whereby at least one side is movable relatively to the other in a direction generally transverse to the recess.

16. The combination according to claim 9, wherein said body is formed of at least two parts and resilient means for interconnecting said parts, said parts being formed to provide said recess and defining a base and a pair of opposed side walls, said parts being arranged so that the parts are movable with respect to each other.

* * * * *